United States Patent
Davis et al.

(10) Patent No.: US 12,249,244 B2
(45) Date of Patent: Mar. 11, 2025

(54) SYSTEM AND METHOD TO DISPLAY AIRPORT MOVING MAP AND TAXI ROUTING GUIDANCE CONTENT FOR COMMONLY USED TAXI ROUTE

(71) Applicant: Rockwell Collins, Inc., Cedar Rapids, IA (US)

(72) Inventors: Jason Davis, Marengo, IA (US); Marcin Kolesinski, Central City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 311 days.

(21) Appl. No.: 17/215,228

(22) Filed: Mar. 29, 2021

(65) Prior Publication Data
US 2022/0309935 A1    Sep. 29, 2022

(51) Int. Cl.
*G08G 5/06*  (2006.01)
*G06N 20/00*  (2019.01)
*G08G 5/00*  (2006.01)

(52) U.S. Cl.
CPC ............. *G08G 5/065* (2013.01); *G06N 20/00* (2019.01); *G08G 5/0013* (2013.01); *G08G 5/0021* (2013.01)

(58) Field of Classification Search
CPC .... G08G 5/065; G08G 5/0013; G08G 5/0021; G06N 20/00
See application file for complete search history.

(56) References Cited

U.S. PATENT DOCUMENTS

| | | |
|---|---|---|
| 6,784,869 B1 | 8/2004 | Clark et al. |
| 6,995,746 B2 | 2/2006 | Aymeric |
| 7,212,890 B2 | 5/2007 | Lafon et al. |
| 7,286,062 B2 | 10/2007 | Feyereisen et al. |
| 7,343,229 B1 | 3/2008 | Wilson |
| 7,375,678 B2 | 5/2008 | Feyereisen et al. |

(Continued)

FOREIGN PATENT DOCUMENTS

| | | |
|---|---|---|
| AU | 7815800 A1 | 4/2001 |
| CN | 110826788 A | 2/2020 |

(Continued)

OTHER PUBLICATIONS

Extended Search Report in European Application No. 22163601.2 dated Aug. 10, 2022, 14 pages.

*Primary Examiner* — Ramsey Refai
(74) *Attorney, Agent, or Firm* — Suiter Swantz IP

(57) ABSTRACT

A system may include a display and a processor communicatively coupled to the display. The processor may be configured to: output, to the display, a view of an airport moving map (AMM); receive aircraft state data and airport surface data; at least based on the current position of the aircraft and at least one factor, obtain commonly used taxi route data from a data structure, the data structure including taxi route data, the taxi route data including information of commonly used taxi routes for the airport, wherein the commonly used taxi route data includes information of a commonly used taxi route for the aircraft on the airport surface; based at least on the commonly used taxi route data, the aircraft state data, and the airport surface data, generate taxi routing guidance content; and output, to the display, the taxi routing guidance content.

12 Claims, 9 Drawing Sheets

(56) References Cited

U.S. PATENT DOCUMENTS

| | | | |
|---|---|---|---|
| 7,499,794 B1 | 3/2009 | Bailey et al. | |
| 7,965,223 B1 | 6/2011 | McCusker | |
| 7,974,773 B1 | 7/2011 | Krenz et al. | |
| 8,159,416 B1 | 4/2012 | Yum et al. | |
| 8,193,948 B1 | 6/2012 | Shapiro et al. | |
| 8,234,066 B2 | 7/2012 | Wipplinger et al. | |
| 8,306,745 B1 | 11/2012 | Clark et al. | |
| 8,433,459 B2 | 4/2013 | Michel et al. | |
| 8,560,214 B1 | 10/2013 | Krenz et al. | |
| 8,620,493 B2 * | 12/2013 | Hughes | G05D 1/0083 701/25 |
| 8,676,399 B2 * | 3/2014 | Nutaro | G08G 5/0091 701/16 |
| 8,698,654 B2 | 4/2014 | He | |
| 8,786,467 B2 | 7/2014 | Clark et al. | |
| 9,000,952 B1 | 4/2015 | VanDerKamp et al. | |
| 9,046,369 B2 | 6/2015 | Chytil et al. | |
| 9,174,744 B2 | 11/2015 | Depape et al. | |
| 9,189,964 B1 | 11/2015 | Rathinam et al. | |
| 9,222,800 B1 | 12/2015 | Scherer et al. | |
| 9,347,794 B1 | 5/2016 | Tiana et al. | |
| 9,389,082 B2 | 7/2016 | Dhulipudi et al. | |
| 9,487,304 B1 | 11/2016 | Bowen et al. | |
| 9,495,879 B2 * | 11/2016 | Depape | G01C 21/3453 |
| 9,517,844 B2 | 12/2016 | Khatwa et al. | |
| 9,527,601 B2 | 12/2016 | Wyatt et al. | |
| 9,561,865 B2 | 2/2017 | Marczi et al. | |
| 9,718,558 B2 | 8/2017 | Ball et al. | |
| 9,779,630 B2 | 10/2017 | Auletto et al. | |
| 9,786,467 B2 | 10/2017 | Iijima | |
| 9,799,225 B2 | 10/2017 | Lueck et al. | |
| 10,140,876 B2 | 11/2018 | Khatwa et al. | |
| 10,168,876 B2 | 1/2019 | Kaprani et al. | |
| 10,234,303 B1 | 3/2019 | Chandrashekarappa et al. | |
| 10,535,276 B2 * | 1/2020 | Schwindt | G08G 5/045 |
| 10,789,854 B1 | 9/2020 | Kolesinski | |
| 2004/0006412 A1 * | 1/2004 | Doose | G01C 21/26 701/122 |
| 2005/0283305 A1 * | 12/2005 | Clark | G01C 23/00 340/972 |
| 2007/0130172 A1 * | 6/2007 | Lee | G06F 16/284 |
| 2008/0270020 A1 * | 10/2008 | Raab | G08G 5/0013 701/533 |
| 2010/0194601 A1 | 8/2010 | Servantie et al. | |
| 2010/0250030 A1 | 9/2010 | Nichols et al. | |
| 2010/0283636 A1 | 11/2010 | Clark et al. | |
| 2012/0194556 A1 | 8/2012 | Schmitt et al. | |
| 2013/0103297 A1 | 4/2013 | Bilek et al. | |
| 2013/0131888 A1 * | 5/2013 | Nutaro | G08G 5/0091 701/1 |
| 2013/0231853 A1 | 9/2013 | Feyereisen et al. | |
| 2014/0249736 A1 * | 9/2014 | Beda | G08G 5/065 701/120 |
| 2014/0303815 A1 | 10/2014 | Lafon et al. | |
| 2016/0152348 A1 | 6/2016 | Mohideen et al. | |
| 2016/0171899 A1 * | 6/2016 | Depare | G08G 5/0021 701/428 |
| 2016/0343262 A1 | 11/2016 | Auletto et al. | |
| 2017/0083206 A1 | 3/2017 | He et al. | |
| 2018/0181299 A1 | 6/2018 | Ouellette et al. | |
| 2019/0004318 A1 | 1/2019 | Descheemaeker et al. | |
| 2019/0043164 A1 | 2/2019 | He | |
| 2019/0066523 A1 | 2/2019 | Pesik et al. | |
| 2019/0172361 A1 | 6/2019 | Schwindt | |
| 2019/0189018 A1 * | 6/2019 | Marik | G08G 5/065 |
| 2019/0228668 A1 | 7/2019 | Wang et al. | |
| 2020/0152071 A1 | 5/2020 | Schwindt | |
| 2021/0134167 A1 * | 5/2021 | Erignac | G05D 1/0088 |

FOREIGN PATENT DOCUMENTS

| | | |
|---|---|---|
| EP | 0880827 A1 | 12/1998 |
| EP | 2000778 B1 | 11/2010 |
| EP | 2610590 B1 | 10/2015 |
| EP | 3446984 A1 | 2/2019 |
| EP | 3476743 A1 | 5/2019 |
| GB | 1592780 A | 7/1981 |
| JP | 1990204787 A | 8/1990 |
| JP | 1994168001 A | 6/1994 |
| WO | 1998052174 A1 | 11/1998 |
| WO | 2007146520 A2 | 12/2007 |

\* cited by examiner

SYSTEM AND METHOD TO DISPLAY AIRPORT MOVING MAP AND TAXI ROUTING GUIDANCE CONTENT FOR COMMONLY USED TAXI ROUTE

BACKGROUND

Currently, flight crew members spend significant amounts of time determining a taxi route while on airport surfaces, which can detract from the flight crew's ability to perform other flight tasks. Flight crews benefit from being able to easily navigate airports to determine where an aircraft is and where the aircraft needs to go. The taxi route that needs to be taken from gate to departure runway or landing runway to gate or hangar may take time for the crew to understand or determine, especially when visiting airports for a crew's first time and/or visiting large and complicated airports. Any time taken by the crew to determine the necessary routing information decreases the time where eyes are down rather than out the window.

SUMMARY

In one aspect, embodiments of the inventive concepts disclosed herein are directed to a system. The system may include a display and a processor communicatively coupled to the display. The processor may be configured to: output, to the display, a view of an airport moving map (AMM), the AMM depicting a location of an aircraft on an airport surface; receive aircraft state data and airport surface data, wherein the airport surface data includes information of the airport surface, wherein the aircraft state data includes a current position of the aircraft; at least based on the current position of the aircraft and at least one factor, obtain commonly used taxi route data from a data structure, the at least one factor including at least one of an airline associated with the aircraft, a size of the aircraft, a weight of the aircraft, a category of the aircraft, a time of day that the aircraft is operating, or airport traffic, the data structure including taxi route data, the taxi route data including information of commonly used taxi routes for the airport, wherein the data structure has fields containing data associated with the commonly used taxi routes, wherein the fields for the commonly used taxi routes include information of at least one of possible airlines, sizes of possible aircraft, weights of possible aircraft, categories of possible aircraft, times of day that the possible aircraft operate, or possible airport traffic, wherein the commonly used taxi route data includes information of a commonly used taxi route for the aircraft on the airport surface; based at least on the commonly used taxi route data, the aircraft state data, and the airport surface data, generate taxi routing guidance content, wherein the taxi routing guidance content includes graphical and/or audio content to be presented to a flight crew to guide the aircraft along the commonly used taxi route; and output, to the display, the taxi routing guidance content. The display may be configured to: present the view of the AMM; and present the taxi routing guidance content.

In a further aspect, embodiments of the inventive concepts disclosed herein are directed to a system. The system may include a computing device offboard of an aircraft. The computing device may include a processor and a non-transitory computer-readable medium. The computing device may be configured to: create a data structure by using artificial intelligence, neural network, and/or machine learning operations, the data structure including taxi route data, the taxi route data including information of commonly used taxi routes for the airport, wherein the data structure has fields containing data associated with the commonly used taxi routes, wherein the fields for the commonly used taxi routes include information of at least one of possible airlines, sizes of possible aircraft, weights of possible aircraft, categories of possible aircraft, times of day that the possible aircraft operate, or possible airport traffic; and output commonly used taxi route data from the data structure to the aircraft at least based on the current position of the aircraft and at least one factor, the at least one factor including at least one of an airline associated with the aircraft, a size of the aircraft, a weight of the aircraft, a category of the aircraft, a time of day that the aircraft is operating, or airport traffic.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
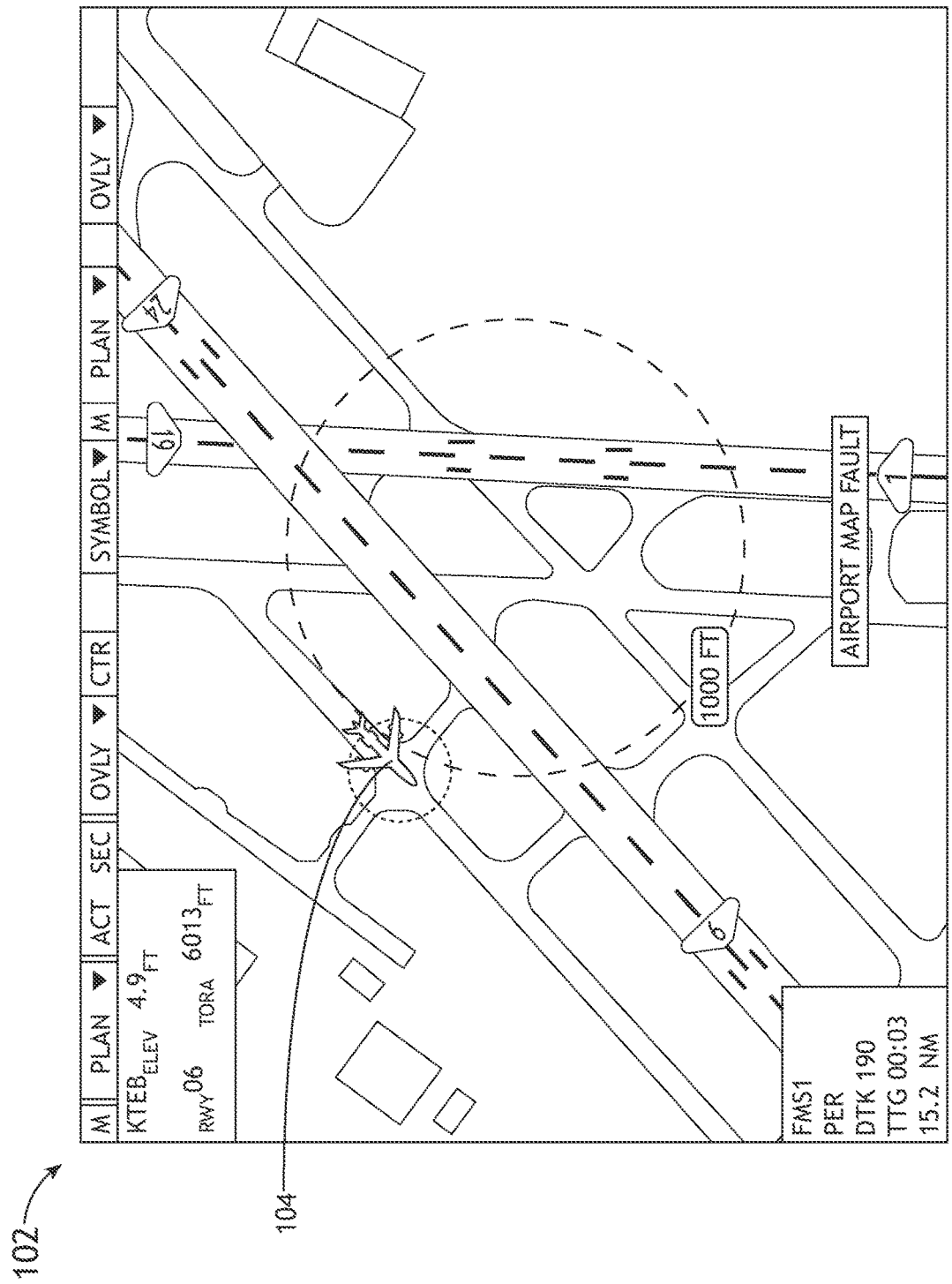
FIG. 1 is an exemplary view of an AMM of an exemplary embodiment according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method configured to present a view of an AMM and taxi routing guidance content for a commonly used taxi route (e.g., a most commonly used taxi route) and a system and method configured to create a data structure including taxi route data by using at least one of artificial intelligence, neural network, or machine learning operations.

Some embodiments include implementation and/or utilization of artificial intelligence, neural networks, and/or machine learning to create a data structure (e.g., a database) of commonly used (e.g., most commonly used) routes for aircraft at least based on at least one factor (e.g., airline, size, weight, category, time of day, airport, and/or traffic). The database may be created by collecting and using real-time data of aircraft that use a specific airport. All routing, which is based on the database, within an airport may be specific to that airport. As more aircraft use the airport and take specific routes (e.g., taxi routes), the system that creates and updates the database may learn what the most probable route would be to get to an intended destination(s). Using aircraft specifics mentioned previously and the database of routes, the system can provide the most probable route as a first option when selecting route guidance. Implementing and utilizing a system of this nature may offer a reduction in confusion and time spent heads-down at new, large, and/or busy airports. The system may allow control towers to override or choose a different taxi route, and pilots may still remain in the loop as the control towers may still provide ultimate direction.

In some embodiments, airport data for use in creating and/or updating the database could be collected in any suitable way. For example, the airport data could be collected via datalink with most probable taxi routes being sent via a datalink to an aircraft requesting a most probable taxi route. For example, the database could be stored in an aircraft, at a specific airport (e.g., at an air traffic control tower), and/or in a cloud computing device.

Referring now to FIG. 1, an exemplary embodiment of an exemplary view 102 of an AMM according to the inventive concepts disclosed herein is depicted. The AMM may include a depiction of an aircraft 104. The AMM may utilize a multi-function window (MFW) map window to provide a more detailed view of airport map data (e.g., at ranges below 2 NM). Often, flight crews will utilize the AMM 102 map ranges (e.g., less than 2 NM) to provide a detailed representation of an airport during ground operations. As shown in FIG. 1, the view 102 of the AMM has an exemplary map range. The AMM may provide a given level of detail within the map based on a selected map range (e.g., automatically declutters or clutters map details based on the selected map range). One of the features provided by the AMM 102 is the ability to determine when the aircraft's 104 ownship track is projected to intersect with a boundary(ies) of a runway and provide an annunciation (e.g., an approaching runway annunciation) to the crew to this effect.

In some embodiments, airport surface database(s) may include airport surface data, which includes information of an airport surface. Such airport surface databases may include the Airport Surface Database (ASDB) and/or the Airport Surface Routing Network (ASRN). For example, the ASRN is a data set containing "nodes" identifying the location and various other characteristics of navigable airport surface features (such as taxiway-taxiway intersections, runway-taxiway intersections, parking stands, etc.) and "edges" providing information on how nodes are interconnected from a navigation standpoint. This information can be used to construct possible paths or routes from one location to another at a given airport.

Some embodiments may include using a taxi route (e.g., a commonly used taxi route (e.g., a most commonly used taxi route)) obtained from a data structure, aircraft state data, and airport surface data to generate taxi routing guidance content. The data structure (e.g., a database) may be stored in a non-transitory computer-readable medium onboard and/or offboard of the aircraft. The data structure may be created by using at least one of artificial intelligence (AI), neural network, or machine learning operations.

In at least one embodiment, AI, neural networks, or other machine learning algorithms may be employed to refine the relationships between an arbitrary set of input parameters and a set of outputs. Relevant data may also be logged and correlated to provide context for later process steps. AI and machine learning in general, and neural networks in particular, employ processing layers organized in a feed forward architecture where neurons (nodes) only receive inputs from the previous layer and deliver outputs only to the following layer, or a recurrent architecture, or some combination thereof. Each layer defines an activation function, comprised of neuron propagation functions, such as a Hyperbolic tangent function, a linear output function, and/or a logistic function, or some combination thereof. AI and machine learning in general, and neural networks in particular, utilize supervised learning conducted during the design phase to establish weighting factors and activation functions for each node. During supervised training, a designer may adjust one or more input biases or synaptic weights of the nodes in one or more processing layers of the neural network according to a loss function that defines an expected performance. Alternatively, or in addition, the designer may utilize certain training data sets, categorized as selection data sets, to choose a predictive model for use by the neural networks. During unsupervised training, the neural network adjusts one or more input biases or synaptic weights of the nodes in one or more processing layers according to an algorithm. In at least one embodiment, where the training data sets include both stable and unstable approaches, the training algorithm may comprise a first component to minimize disparity with approaches labeled "stable" and a second component to prevent close approximation with approaches labeled "unstable." A person skilled in the art may appreciate that maximizing disparity with unstable approaches may be undesirable until the neural network has been sufficiently trained or designed so as to define constraints of normal operation within which both stable and unstable approaches are conceivable. In at least one embodiment, training data sets may be categorized based on a defined level of stability or instability, and provided in ascending order of convergence such that the disparities between stable and unstable approaches diminish during training and necessary adjustments presumably become smaller over time according to first and second order deviations of the corresponding loss function. The loss function may define error according to mean square, root mean square, normalized square, a weighted square, or some combination thereof, where the gradient of the loss function may be calculated via backpropagation.

Figure 2:
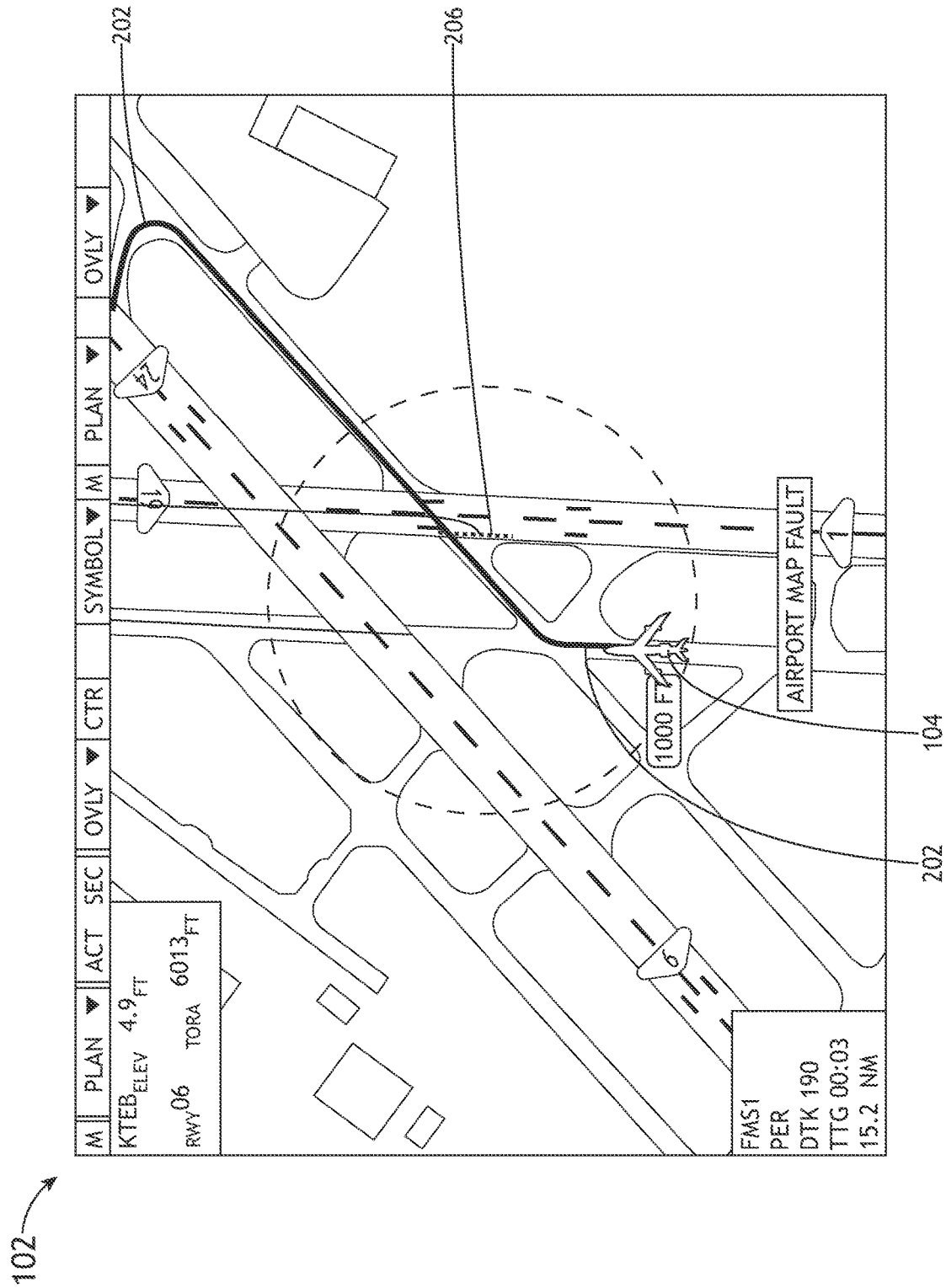
FIG. 2 is a further exemplary view of an AMM of an exemplary embodiment according to the inventive concepts disclosed herein.

Referring now to FIG. 2, an exemplary embodiment of an exemplary view of the AMM for an exemplary situation according to the inventive concepts disclosed herein is depicted. As shown, the AMM shows the aircraft 104, a taxi route 202 (e.g., (e.g., a commonly used taxi route (e.g., a most commonly used taxi route)), and runway boundary 206. In this example, aircraft 104 is headed approximately north on the taxi route 202, which includes curves. The taxi route 202 shows that the approaching runway indication should be triggered when within an appropriate predefined range of runway boundary 206 (e.g., to cross RWY 01/19) while following the taxi route 202.

Figure 3:
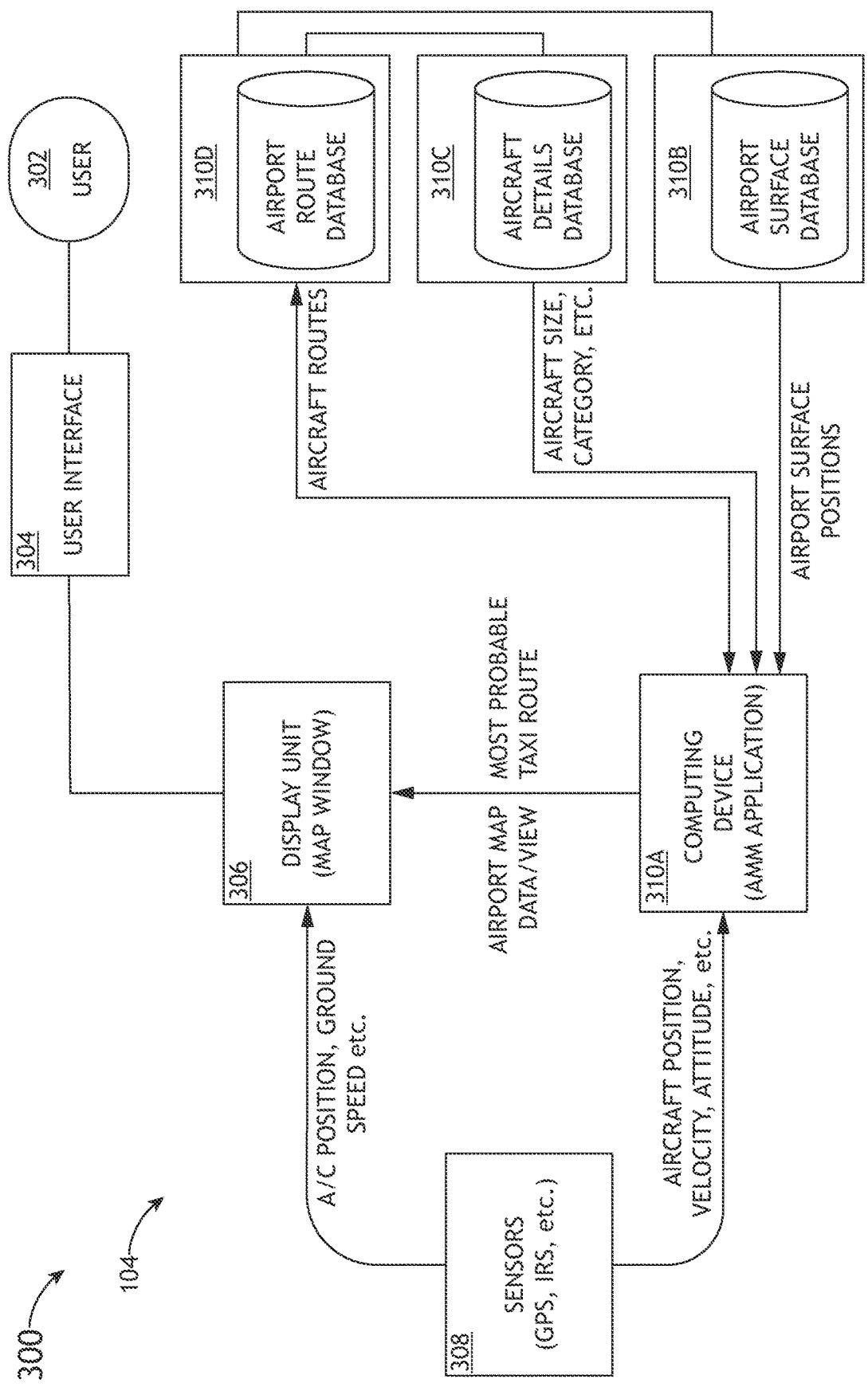
FIG. 3 is a view of an exemplary embodiment of a system including an aircraft according to the inventive concepts disclosed herein.
Figure 4:
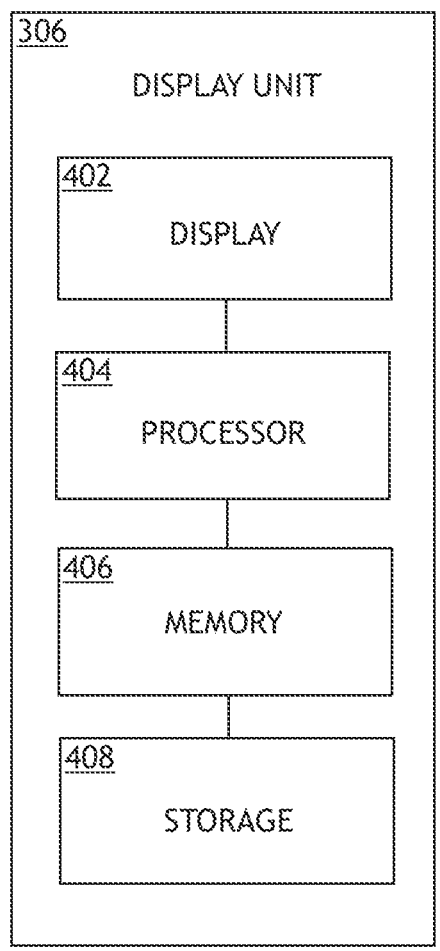
FIG. 4 is a view of an exemplary embodiment of the display unit computing device of FIG. 3 according to the inventive concepts disclosed herein.
Figure 5:
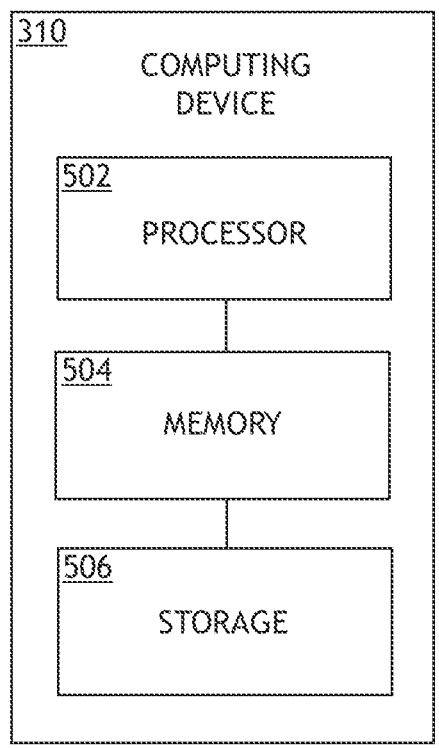
FIG. 5 is a view of an exemplary embodiment of a computing device of FIG. 3 according to the inventive concepts disclosed herein.

Referring now to FIGS. 3, 4 and 5, an exemplary embodiment of a system 300 according to the inventive concepts disclosed herein is depicted. In some embodiments, the system 300 may include ground control (e.g., air traffic control (not shown)) and the aircraft 104, which in one example may include at least one user 302, at least one user interface 304, at least one display unit computing device 306, sensors 308, at least one computing device 310A, at least one computing device 310B, at least one computing device 310C, and/or at least one computing device 310D, some or all of which may be communicatively coupled at any given time. In some embodiments, the at least one computing device 310D may be implemented offboard of the aircraft 104, such as in the cloud or in an air traffic control tower. In some embodiments, the at least one display unit computing device 306, the at least one computing device 310A, the at least one computing device 310B, the at least one computing device 310C, and/or the at least one computing device 310D may be implemented as a single computing device or any number of computing devices configured to perform any or all of the operations disclosed throughout. In some embodiments, some or all of the at least one display unit computing device 306, the at least one computing device 310A, the at least one computing device 310B, the at least one computing device 310C, and/or the at least one computing device 310D may be implemented onboard the aircraft 104. In some embodiments, the at least one display unit computing device 306, the at least one computing device 310A, the at least one computing device 310B, the at least one computing device 310C, and/or the at least one computing device 310D may be implemented offboard of the aircraft 104.

The user 302 may be a pilot or crew member. The user 302 may be configured to interface with the system via the user interface 304, for example, to engage, disengage, or override automatic changes to map ranges for the AMM, to confirm a commonly used taxi route (e.g., a most commonly used taxi route), and/or to enter information regarding an instructed taxi route (e.g., instructed by ground control). The at least one user interface 304 may be implemented as any suitable user interface, such as a touchscreen (e.g., of the display unit computing device 306 and/or another display unit), a multipurpose control panel, a cursor control panel, a keyboard, a mouse, a trackpad, a button, a switch, an eye tracking system, and/or a voice recognition system. The user interface 304 may be configured to receive a user selection and to output the user selection to a computing device (e.g., the display unit computing device 306).

The display unit computing device 306 may be implemented as any suitable computing device, such as an MFW computing device. As shown in FIG. 4, the display unit computing device 306 may include at least one display 402, at least one processor 404, at least one memory 406, and/or storage 408, some or all of which may be communicatively coupled at any given time. For example, the at least one processor 404 may include at least one general purpose processor (e.g., at least one central processing unit (CPU)), at least one digital signal processor (DSP), at least one application specific integrated circuit (ASIC), and/or at least one field-programmable gate array (FPGA). The processor 404 may be configured to run various software applications (e.g., a map window application) or computer code stored (e.g., maintained) in a non-transitory computer-readable medium (e.g., memory 406 and/or storage 408) and configured to execute various instructions or operations. The processor 404 may be configured to perform any or all of the operations disclosed throughout. For example, the processor 404 may be configured to: receive sensor data from the sensors 308; execute the map window application; receive data and views of the AMM 102; receive taxi route data (e.g., instructed taxi route data or commonly used taxi route data (e.g., most commonly used taxi route data) from a data structure); receive approaching runway annunciations; receive taxi routing guidance content; output the views of the AMM to the display 402; and/or output the taxi routing guidance content to the display 402. The display 402 may be configured to: present the view of the AMM; and/or present the taxi routing guidance content.

The sensors 308 may be any suitable sensors configured to output sensor data to another computing device (e.g., 306, 310A, and/or 310B). For example, the sensors 308 may include any or all of the following: at least one global positioning system (GPS) sensor; at least one inertial reference system (IRS) sensor; at least one throttle position sensor; at least one aircraft position sensor; at least one groundspeed sensor; and/or any other sensors commonly installed in aircraft. The sensors 308 may be configured to output sensor data (e.g., aircraft position and/or speed) to some or all of the computing devices (e.g., 306, 310A, 310B, 310C, and/or 310D).

The computing device 310A may be implemented as any suitable computing device, such as an AMM computing device. As shown in FIG. 5, the computing device 310A may include the elements of the computing device 310 and may include at least one processor 502, at least one memory 504, and/or at least one storage 506, some or all of which may be communicatively coupled at any given time. For example, the at least one processor 502 may include at least one general purpose processor (e.g., at least one central processing unit (CPU)), at least one digital signal processor (DSP), at least one application specific integrated circuit (ASIC), and/or at least one field-programmable gate array (FPGA). The processor 502 may be configured to run various software applications (e.g., an AMM application) or computer code stored (e.g., maintained) in a non-transitory computer-readable medium (e.g., memory 504 and/or storage 506) and configured to execute various instructions or operations. The processor 502 of the computing device 310A may be configured to perform any or all of the operations disclosed throughout. For example, the processor 502 of the computing device 310A may be configured to: receive sensor data from the sensors 308; receive aircraft state data and/or airport surface data; execute the AMM application; receive taxi route data (e.g., instructed taxi route data or commonly used taxi route data (e.g., most commonly used taxi route data) from a data structure); receive ownship data parameters (e.g., from the computing device 310C); generate data and views of an AMM; output, to the at least one display (e.g., 402), a view of an AMM, the AMM depicting a location of the aircraft 104 on an airport surface; at least based on the current position of the aircraft and at least one factor, obtain commonly used taxi route data from a data structure, the at least one factor including at least one of an airline associated with the aircraft 104, a size of the aircraft 104, a weight of the aircraft 104, a category of the aircraft 104, a time of day that the aircraft 104 is operating, or airport traffic, the data structure including taxi route data, the taxi route data including information of commonly used taxi routes for the airport, wherein the data structure has fields containing data associated with the commonly used taxi routes, wherein the fields for the commonly used taxi routes include information of at least one of possible airlines, sizes of possible aircraft, weights of possible aircraft, categories of possible aircraft, times of day that the possible aircraft operate, or possible airport traffic, wherein the commonly used taxi route data includes information of a commonly used taxi route for the aircraft 104 on the airport surface; and/or output (e.g., to the at least one display 402) the taxi routing guidance content. In some embodiments, the taxi routing guidance content may include the taxi route 202 (e.g., a commonly used taxi route (e.g., a most commonly used taxi route data)), runway boundary(ies) (e.g., 206), textual guidance directions, arrows indicating to turn or move straight, and/or audible cues or directions.

In some embodiments, the aircraft state data includes the sensor data, is derived from the sensor data, or includes some sensor data and is derived from at least one other portion of the sensor data. For example, the aircraft state data may include information of at least one of: an aircraft position relative to the airport surface or a ground speed of the aircraft 104.

The computing device 310B may be implemented as any suitable computing device, such as an airport surface database computing device. As shown in FIG. 5, the computing device 310B may include the elements of the computing device 310 and may include at least one processor 502, at least one memory 504, and/or at least one storage 506, some or all of which may be communicatively coupled at any given time. For example, the at least one processor 502 may include at least one general purpose processor (e.g., at least one central processing unit (CPU)), at least one digital signal processor (DSP), at least one application specific integrated circuit (ASIC), and/or at least one field-programmable gate array (FPGA). The processor 502 may be configured to run various software applications (e.g., a database application) or computer code stored (e.g., maintained) in a non-transitory computer-readable medium (e.g., memory 504 and/or storage 506) and configured to execute various instructions or operations. The processor 502 of the computing device 310B may be configured to perform any or all of the operations disclosed throughout. For example, the processor 502 of the computing device 310B may be configured to output airport surface data (which may be stored in the memory 504 and/or storage 506 of the computing device 310B) to the computing device 310A.

The computing device 310C may be implemented as any suitable computing device, such as an aircraft details database computing device. As shown in FIG. 5, the computing device 310C may include the elements of the computing device 310 and may include at least one processor 502, at least one memory 504, and/or at least one storage 506, some or all of which may be communicatively coupled at any given time. For example, the at least one processor 502 may include at least one general purpose processor (e.g., at least one central processing unit (CPU)), at least one digital signal processor (DSP), at least one application specific integrated circuit (ASIC), and/or at least one field-programmable gate array (FPGA). The processor 502 may be configured to run various software applications (e.g., a database application) or computer code stored (e.g., maintained) in a non-transitory computer-readable medium (e.g., memory 504 and/or storage 506) and configured to execute various instructions or operations. The processor 502 of the computing device 310C may be configured to perform any or all of the operations disclosed throughout. For example, the processor 502 of the computing device 310C may be configured to output ownship data parameters (which may be stored in the memory 504 and/or storage 506 of the computing device 310B) to the computing device 310A. For example, the ownship data parameters may include a current position of the aircraft 104, a ground speed of the aircraft 104, a direction of the aircraft 104, braking parameters of the aircraft 104, a size of the aircraft 104, a weight of the aircraft 104, an aircraft category of the aircraft 104, and/or common routes taken by other aircraft of a same category as the aircraft 104. For example, aircraft categories may include any or all of the following: military aircraft (e.g., likely heading to or from hangars or other areas of the airport associated with military use; general aviation aircraft (e.g., likely heading to or from hangars or terminals typically used by general aviation aircraft; business aircraft (e.g., likely heading to or from a fixed base operator (FBO) area, such as a corporate jet likely heading to or from a corporate hangar; commercial aircraft (e.g., likely heading to or from a commercial terminal); carrier specific aircraft (e.g., a given airline aircraft likely heading to or from a terminal associated with the given airline; and/or cargo aircraft (e.g., likely going to or from cargo terminals, such as may be associated with a given cargo carrier (e.g., FedEx or UPS).

The computing device 310D may be implemented as any suitable computing device, such as an AI, neural network, and/or machine learning computing device configured to perform AI, neural network, and/or machine learning operations, such as exemplarily disclosed throughout. In some embodiments, the computing device 310D may be implemented onboard or offboard the aircraft 104. As shown in FIG. 5, the computing device 310D may include the elements of the computing device 310 and may include at least one processor 502, at least one memory 504, and/or at least one storage 506, some or all of which may be communicatively coupled at any given time. For example, the at least one processor 502 may include at least one general purpose processor (e.g., at least one central processing unit (CPU)), at least one digital signal processor (DSP), at least one application specific integrated circuit (ASIC), and/or at least one field-programmable gate array (FPGA). The processor 502 may be configured to run various software applications (e.g., AI applications, neural network applications, machine learning applications, and/or database applications) or computer code stored (e.g., maintained) in a non-transitory computer-readable medium (e.g., memory 504 and/or storage 506) and configured to execute various instructions or operations. The processor 502 of the computing device 310C may be configured to perform any or all of the operations disclosed throughout. For example, the processor 502 of the computing device 310C may be configured to: collect (e.g., from various aircraft via datalinks) information of commonly used taxi routes for the airport; create and/or update a data structure (e.g., a database, such as an airport route database) by using at least one of artificial intelligence, neural network, or machine learning operations, the data structure including taxi route data, the taxi route data including information of commonly used taxi routes for the airport, wherein the data structure has fields containing data associated with the commonly used taxi routes, wherein the fields for the commonly used taxi routes include information of at least one of possible airlines, sizes of possible aircraft, weights of possible aircraft, categories of possible aircraft, times of day that the possible aircraft operate, or possible airport traffic; store and/or maintain the data structure in a non-transitory computer-readable medium (e.g., memory 504 and/or storage 506); and/or output commonly used taxi route data from the data structure to the aircraft 104 at least based on the current position of the aircraft 104 and at least one factor, the at least one factor including at least one of an airline associated with the aircraft 104, a size of the aircraft 104, a weight of the aircraft 104, a category of the aircraft 104, a time of day that the aircraft 104 is operating, or airport traffic.

For example, at least one processor (e.g., the at least one processor 404, the at least one processor 502 of the computing device 310A, the at least one processor 502 of the computing device 310B, the at least one processor 502 of the computing device 310C, and/or the at least one processor 502 of the computing device 310D) may be configured to perform (e.g., collectively perform, if more than one processor) any or all of the operations disclosed throughout.

In some embodiments, at least one processor (e.g., the at least one processor 404, the at least one processor 502 of the computing device 310A, the at least one processor 502 of the computing device 310B, the at least one processor 502 of the computing device 310C, and/or the at least one processor 502 of the computing device 310D) may be configured to perform (e.g., collectively perform, if more than one processor) to perform any or all of the following: output, to the at least one display 402, a view of an airport moving map (AMM), the AMM depicting a location of an aircraft 104 on an airport surface; receive aircraft state data and airport surface data, wherein the airport surface data includes information of the airport surface, wherein the aircraft state data includes a current position of the aircraft 104, a ground speed, and/or a direction; at least based on the current position of the aircraft and at least one factor, obtain commonly used taxi route data from a data structure, the at least one factor including at least one of an airline associated with the aircraft, a size of the aircraft, a weight of the aircraft, a category of the aircraft, a time of day that the aircraft is operating, or airport traffic, the data structure including taxi route data, the taxi route data including information of commonly used taxi routes for the airport, wherein the data structure has fields containing data associated with the commonly used taxi routes, wherein the fields for the commonly used taxi routes include information of at least one of possible airlines, sizes of possible aircraft, weights of possible aircraft, categories of possible aircraft, times of day that the possible aircraft operate, or possible airport traffic, wherein the commonly used taxi route data includes information of a commonly used taxi route (e.g., a most commonly used taxi route) for the aircraft on the airport surface; based at least on the commonly used taxi route data, the aircraft state data, and the airport surface data, generate taxi routing guidance content, wherein the taxi routing guidance content includes at least one of graphical or audio content to be presented to a flight crew to guide the aircraft along the commonly used taxi route; and/or output, to the at least one display 402, the taxi routing guidance content.

Figure 6:
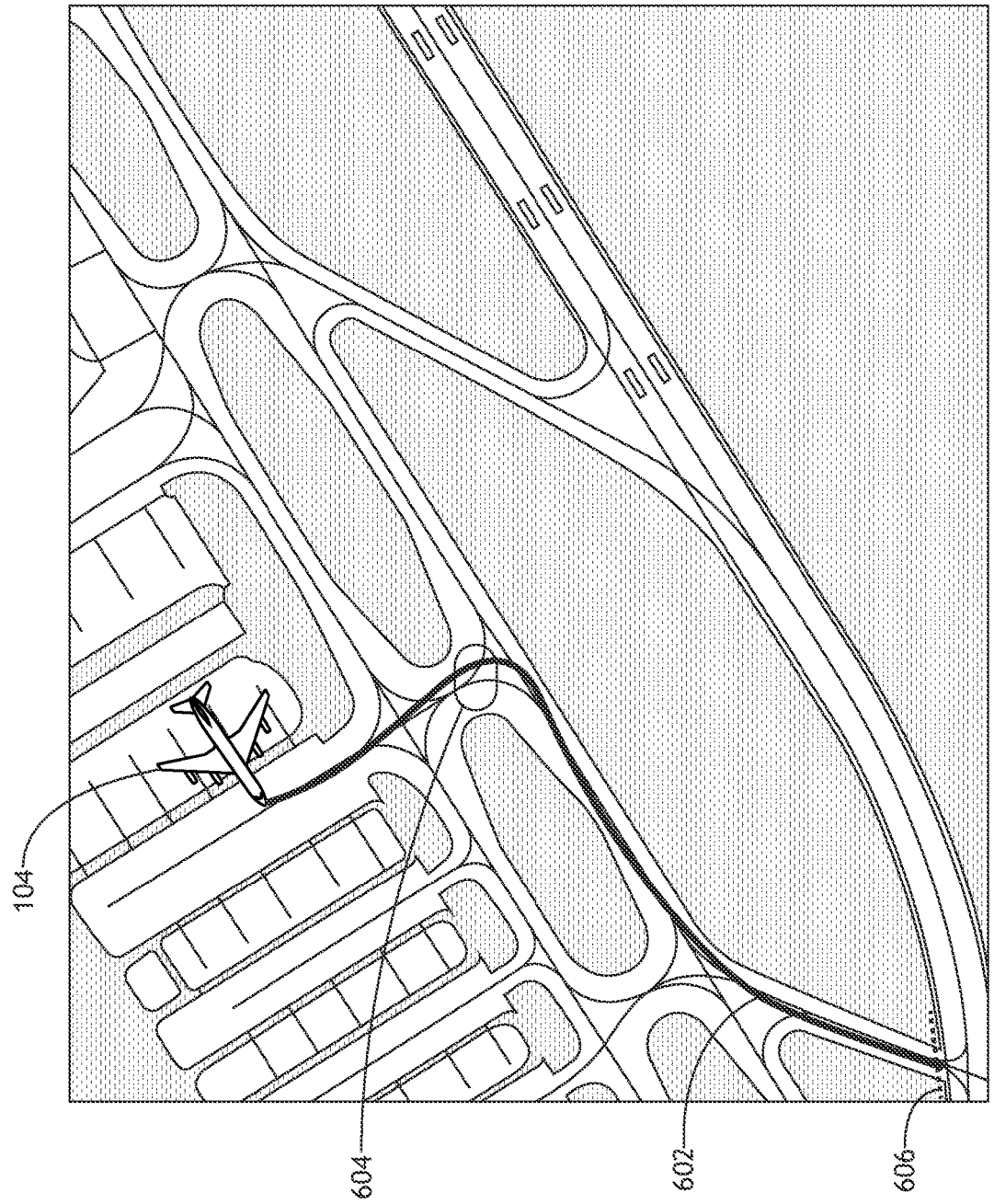
FIG. 6 is a further exemplary view of an AMM of an exemplary embodiment according to the inventive concepts disclosed herein.
Figure 7:
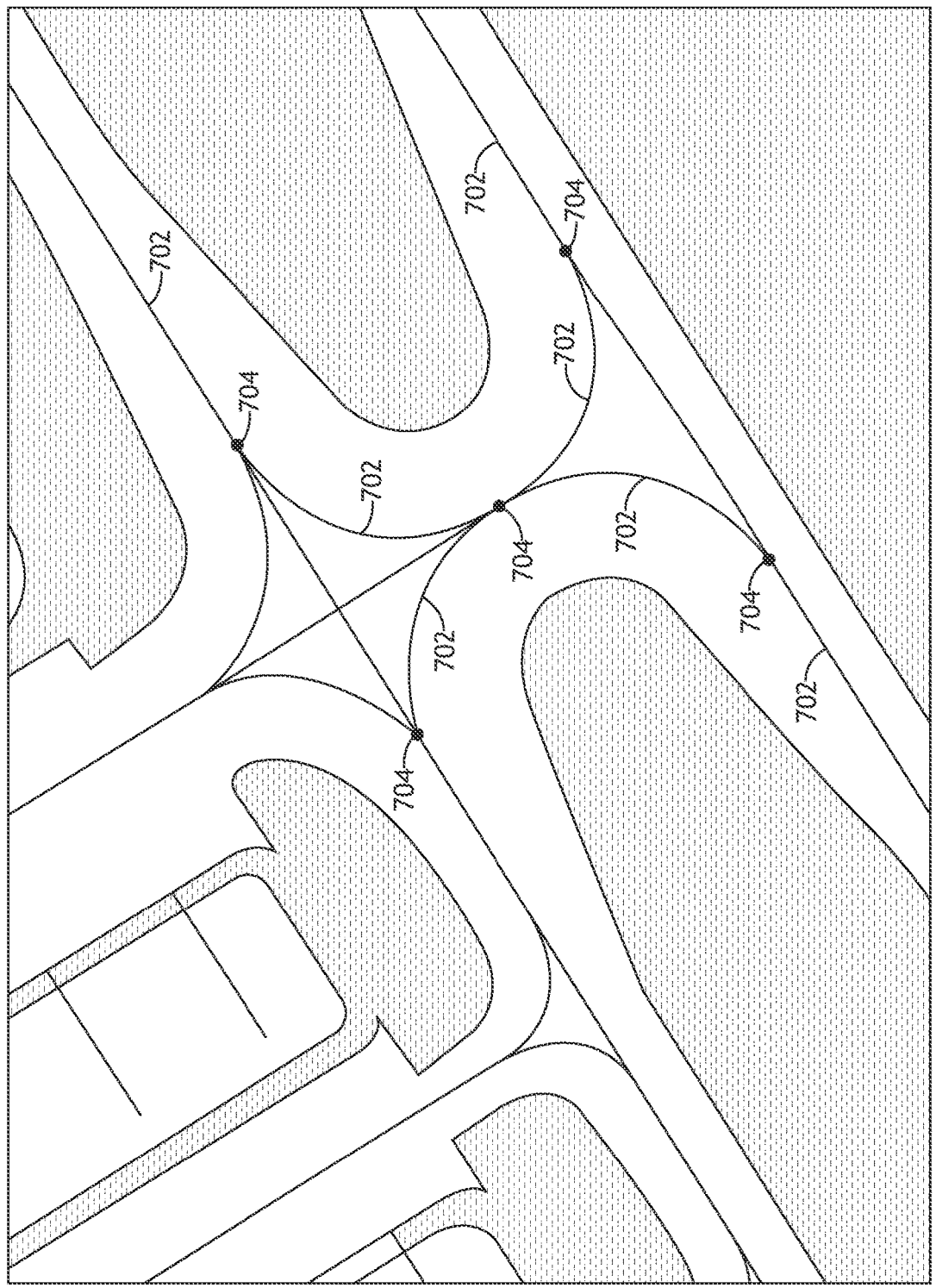
FIG. 7 is a further exemplary view of an AMM of an exemplary embodiment according to the inventive concepts disclosed herein.

Referring now to FIGS. 6-7, an exemplary embodiment of exemplary views of the AMM for an exemplary situation according to the inventive concepts disclosed herein is depicted. As shown in FIG. 6, the AMM shows the aircraft 104, a taxi route 602 (e.g., a commonly used taxi route (e.g., a most commonly used taxi route)), at least one intersection 604, and a runway boundary 606. As shown in FIG. 6, the aircraft 104 may follow the taxi route 602. The runway boundary 606 indicates a runway edge. As shown in FIG. 7, the AMM shows edges 702 and nodes 704, which may form part of taxi routes (such as, taxi route 602).

Figure 8:
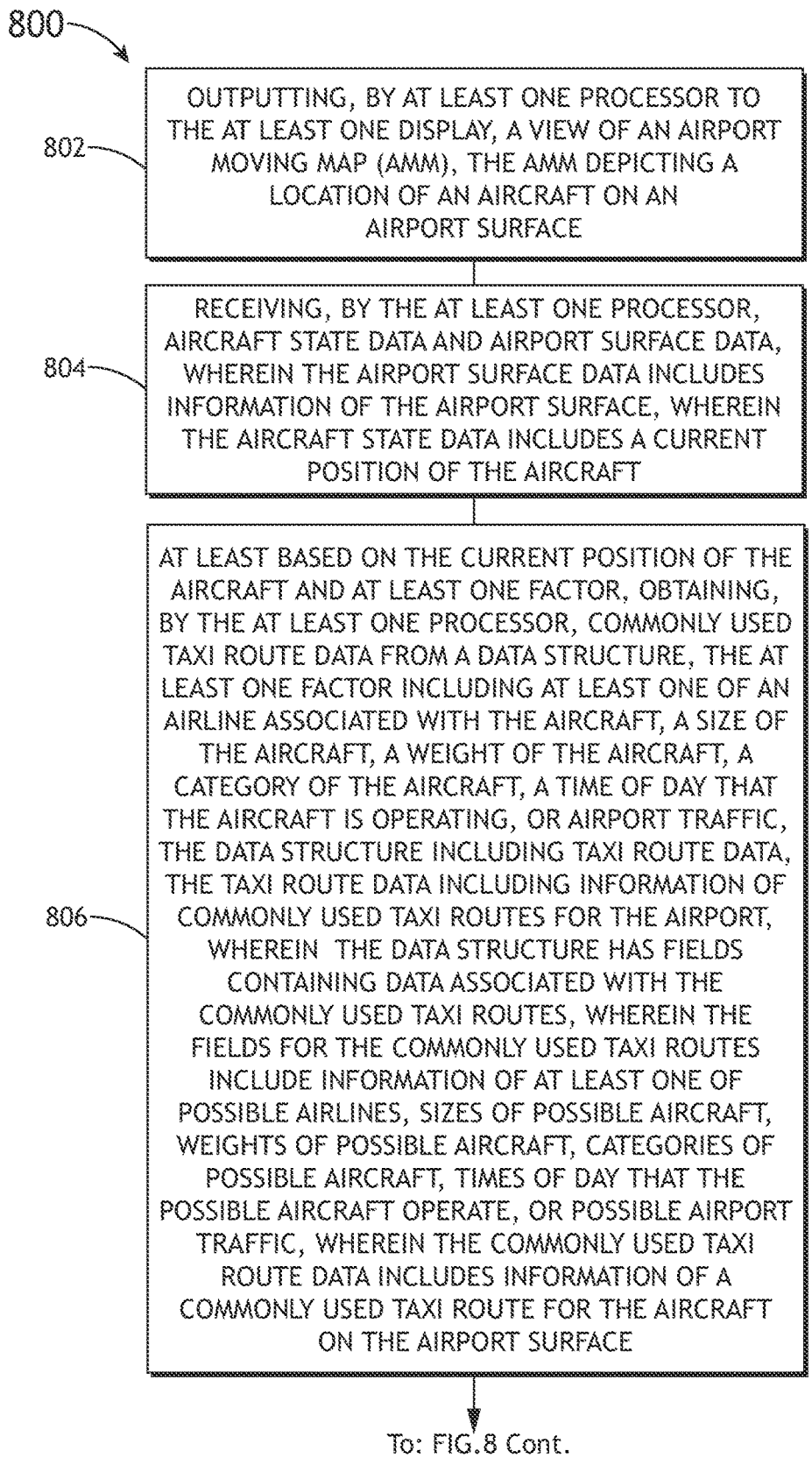
FIG. 8 is a diagram of an exemplary embodiment of a method according to the inventive concepts disclosed herein.
Figure 8:
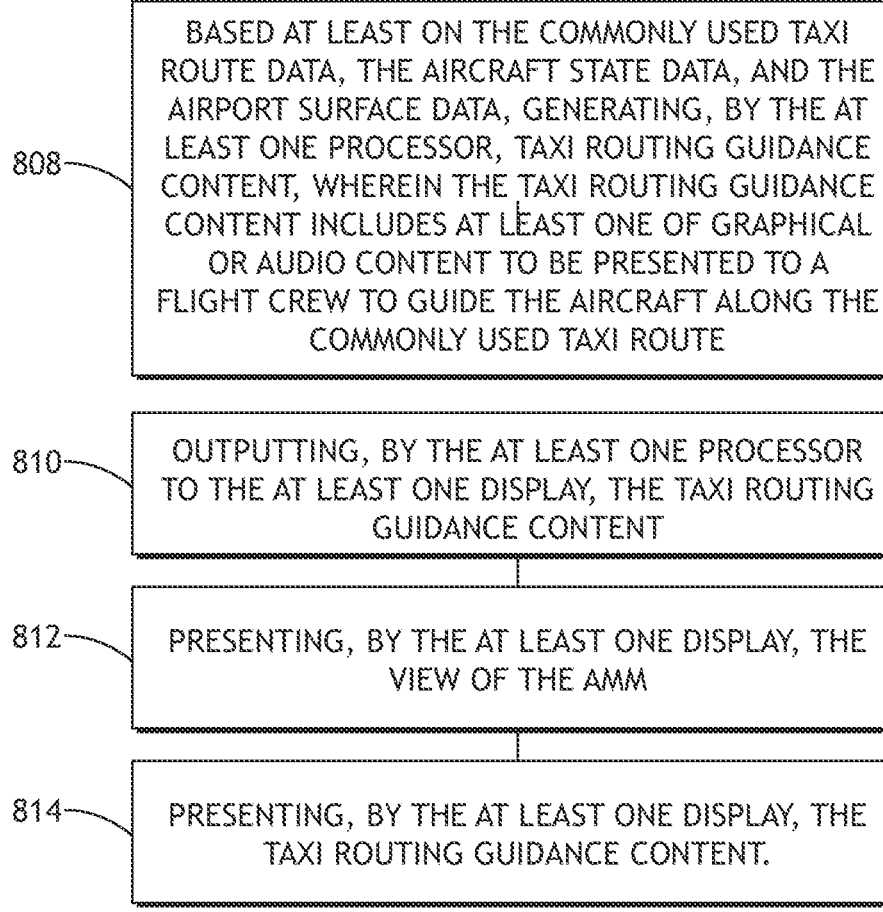

Referring now to FIG. 8, an exemplary embodiment of a method 800 according to the inventive concepts disclosed herein may include one or more of the following steps. Additionally, for example, some embodiments may include performing one or more instances of the method 800 iteratively, concurrently, and/or sequentially. Additionally, for example, at least some of the steps of the method 800 may be performed in parallel and/or concurrently. Additionally, in some embodiments, at least some of the steps of the method 800 may be performed non-sequentially.

A step 802 may include outputting, by at least one processor to the at least one display, a view of an airport moving map (AMM), the AMM depicting a location of an aircraft on an airport surface.

A step 804 may include receiving, by the at least one processor, aircraft state data and airport surface data, wherein the airport surface data includes information of the airport surface, wherein the aircraft state data includes a current position of the aircraft.

A step 806 may include at least based on the current position of the aircraft and at least one factor, obtaining, by the at least one processor, commonly used taxi route data from a data structure, the at least one factor including at least one of an airline associated with the aircraft, a size of the aircraft, a weight of the aircraft, a category of the aircraft, a time of day that the aircraft is operating, or airport traffic, the data structure including taxi route data, the taxi route data including information of commonly used taxi routes for the airport, wherein the data structure has fields containing data associated with the commonly used taxi routes, wherein the fields for the commonly used taxi routes include information of at least one of possible airlines, sizes of possible aircraft, weights of possible aircraft, categories of possible aircraft, times of day that the possible aircraft operate, or possible airport traffic, wherein the commonly used taxi route data includes information of a commonly used taxi route for the aircraft on the airport surface.

A step 808 may include based at least on the commonly used taxi route data, the aircraft state data, and the airport surface data, generating, by the at least one processor, taxi routing guidance content, wherein the taxi routing guidance content includes at least one of graphical or audio content to be presented to a flight crew to guide the aircraft along the commonly used taxi route.

A step 810 may include outputting, by the at least one processor to the at least one display, the taxi routing guidance content.

A step 812 may include presenting, by the at least one display, the view of the AMM.

A step 814 may include presenting, by the at least one display, the taxi routing guidance content.

Further, the method 800 may include any of the operations disclosed throughout.

As will be appreciated from the above, embodiments of the inventive concepts disclosed herein may be directed to a system and a method configured to present a view of an AMM and taxi routing guidance content for a commonly used taxi route (e.g., a most commonly used taxi route) and a system and method configured to create a data structure including taxi route data by using at least one of artificial intelligence, neural network, or machine learning operations.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
at least one display;
at least one processor communicatively coupled to the at least one display, the at least one processor configured to:
output, to the at least one display, a view of an airport moving map (AMM), the AMM depicting a location of an aircraft on an airport surface, wherein the AMM has a range of below 2 nautical miles (NM);
receive aircraft state data and airport surface data, wherein the airport surface data includes information of the airport surface, wherein the aircraft state data includes a current position of the aircraft, wherein the airport surface data further includes information of nodes identifying a location and other characteristics of navigable airport surface features and edges providing information on how nodes are interconnected from a navigation standpoint;
at least based on the current position of the aircraft and at least one factor, obtain commonly used taxi route data from a data structure, the at least one factor including at least one of an airline associated with the aircraft, a size of the aircraft, a weight of the aircraft, a category of the aircraft, a time of day that the aircraft is operating, or airport traffic, the data structure including taxi route data, the taxi route data including information of commonly used taxi routes for the airport, wherein the data structure has fields containing data associated with the commonly used taxi routes, wherein the fields for the commonly used taxi routes include information of at least one of possible airlines, sizes of possible aircraft, weights of possible aircraft, categories of possible aircraft, times of day that the possible aircraft operate, or possible airport traffic, wherein the commonly used taxi route data includes information of a commonly used taxi route for the aircraft on the airport surface;

based at least on the commonly used taxi route data, the aircraft state data, and the airport surface data, generate taxi routing guidance content, wherein the taxi routing guidance content includes at least one of graphical or audio content to be presented to a flight crew to guide the aircraft along the commonly used taxi route; and output, to the at least one display, the taxi routing guidance content; and at least one computing device located offboard of the aircraft, each of the at least one computing device comprising one or more processors and at least one non-transitory computer-readable medium, wherein the at least one computing device is configured to:

based at least on the at least one factor including the at least one of the airline associated with the aircraft, the size of the aircraft, the weight of the aircraft, the category of the aircraft, the time of day that the aircraft is operating, or the airport traffic, create the data structure by using at least one of artificial intelligence, neural network, or machine learning operations on a collection of data of multiple aircraft using the airport; and as more of the multiple aircraft use the airport and take specific taxi routes, learn a probable taxi route to get to an intended destination, wherein the commonly used taxi route is the probable taxi route;

wherein the at least one display is configured to:
present the view of the AMM; and
present the taxi routing guidance content.

2. The system of claim 1, wherein the aircraft state data further includes a ground speed and a direction.

3. The system of claim 1, wherein the commonly used taxi route is a most commonly used taxi route.

4. The system of claim 1, wherein the at least one factor further includes the airline associated with the aircraft, the size of the aircraft, the weight of the aircraft, the category of the aircraft, the time of day that the aircraft is operating, and the airport traffic, wherein the fields for the commonly used taxi routes further include information of the possible airlines, the sizes of possible aircraft, the weights of possible aircraft, the categories of possible aircraft, the times of day that the possible aircraft operate, and the possible airport traffic.

5. The system of claim 1, wherein the at least one factor further includes the airline associated with the aircraft.

6. The system of claim 1, wherein the at least one factor further includes the size of the aircraft.

7. The system of claim 1, wherein the at least one factor further includes the weight of the aircraft.

8. The system of claim 1, wherein the at least one factor further includes the category of the aircraft.

9. The system of claim 1, wherein the at least one factor further includes the time of day that the aircraft is operating.

10. The system of claim 1, wherein the at least one factor further includes the airport traffic.

11. The system of claim 1, wherein the data structure is stored in one or more of the at least one non-transitory computer-readable medium offboard of the aircraft.

12. The system of claim 1, wherein the probable taxi route is the most probable taxi route.

\* \* \* \* \*